United States Patent

[11] 3,554,128

[72] Inventors Warren R. Hoelzen
  Ontario;
  Charles R. Hamilton, Riverside, Calif.
[21] Appl. No. 286,891
[22] Filed June 7, 1963
[45] Patented Jan. 12, 1971
[73] Assignee The United States of America as represented by the Secretary of the Navy

[54] SAFETY-ARMING DEVICE FOR USE IN FUZES
  8 Claims, 7 Drawing Figs.
[52] U.S. Cl. ..................................................... 102/70.2,
  102/78, 102/80
[51] Int. Cl. ...................................................... F42c 21/00,
  F42c 15/24, F42c 7/00
[50] Field of Search .......................................... 102/76, 78,
  81, 70.2, 7, 8, (Digest)

No references cited.

Primary Examiner—Benjamin A. Borchelt
Assistant Examiner—Thomas H. Webb
Attorney—Q. Baxter Warner, J. M. St. Amand and T. M. Phillips ABSTRACT: 1. In an inertia operated safety-arming device for a missile, the improvement comprising:

(a) a setback weight having first and second operating positions and being mounted for longitudinal reciprocal motion, (b) means for locking said setback weight in said first and said second operating positions, (c) means responsive to longitudinal acceleration forces normally encountered in missile flight for arming said device, (d) first resilient means coupled to said setback weight for allowing said setback weight to travel a predetermined distance intermediate said first and second operating positions in response to acceleration forces encountered in normal missile flight, (e) second resilient means coupled to said setback weight for allowing said setback weight to travel a distance greater than said predetermined distance to said second operating position in response only to acceleration forces greater than said acceleration forces encountered in normal missile flight, (f) control means coupling said arming means to said setback weight for permitting said arming means to return to a safe condition when said setback weight is locked in said second operating position and acceleration forces opposite to the acceleration forces for arming said device are applied.

The invention herein described may be manufactured and used by or for the Government of the United States of America for governmental purposes without the payment of any royalties thereon or therefor.

WARREN R. HOELZEN
CHARLES R. HAMILTON
INVENTORS

WARREN R. HOELZEN
CHARLES R. HAMILTON
INVENTORS

BY *T. M. Phillips*
*J. M. St. Amand*
ATTORNEYS

SAFETY-ARMING DEVICE FOR USE IN FUZES

The present invention relates to safety-arming devices for use in fuzes and more particularly to improved safety-arming devices which can be reset to its safe condition after arming without disassembly of the device or removal of the internal mechanism from its housing. The present invention is an improvement over the safety-arming device shown and described in copending application Ser. No. 772,152 of Louis Voida et al. for Counter-Rotating Dual Rotor Safety and Arming Mechanism, filed Oct. 7, 1958.

Safety-arming devices must all be tested to determine that they arm in the specified manner when supplied with the required mechanical and electrical inputs. Previously, the devices had to be tested prior to solder sealing of the housing; after arming the devices to test their performance, it was necessary to remove the mechanism from the housing and manually reset the device to a safe condition. After testing and resetting, the device was reinstalled into the housing and the housing solder sealed. Handling of the mechanism and manual manipulation of the parts to reset them can cause damage to the mechanism or electrical circuitry which could not be detected after its final assembly and sealing.

The present invention permits testing of the safety-arming device at a considerable saving of time over that of the prior testing, disassembly, reassembly and sealing. Also, the present invention permits the testing of devices following long term storage on a sampling basis without destroying the device in the process as in the case of prior known safety-arming devices.

An object of the present invention is to provide an improved safety-arming device which may be tested for proper performance in arming and reset to a safe condition without recourse to disassembly and reassembly of the device.

Another object of the invention is to provide an improved safety-arming device which can be tested without destroying the device.

Other objects and many of the attendant advantages of this invention will become readily appreciated as the same becomes better understood by reference to the following detailed description when considered in connection with the accompanying drawings wherein.

Figure 1:
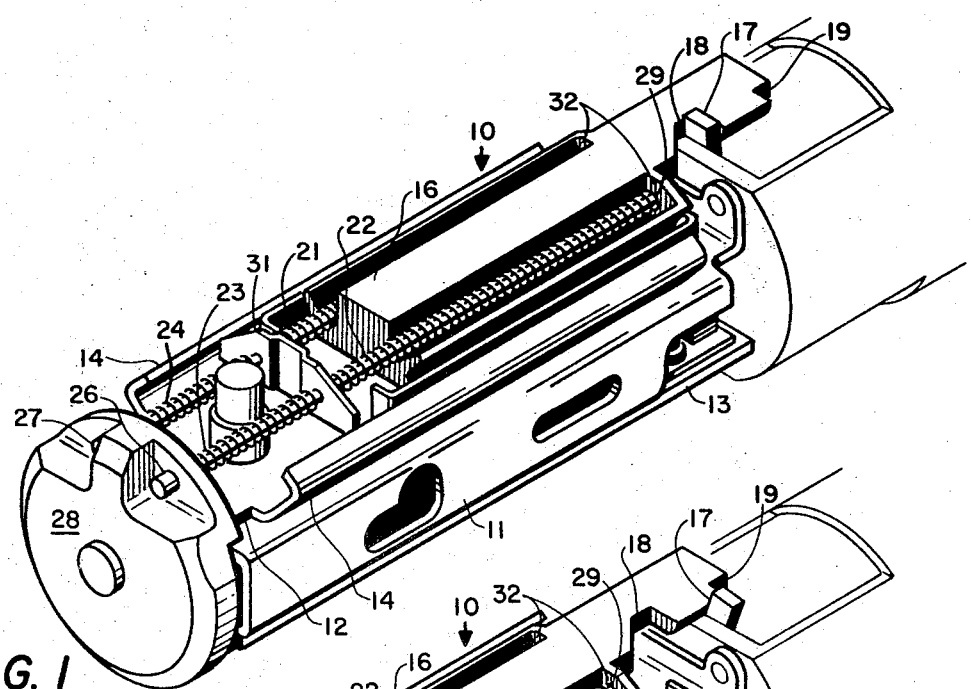
FIG. 1 is a perspective view of the safety-arming device showing the setback weight in the forward and locked position.
Figure 2:
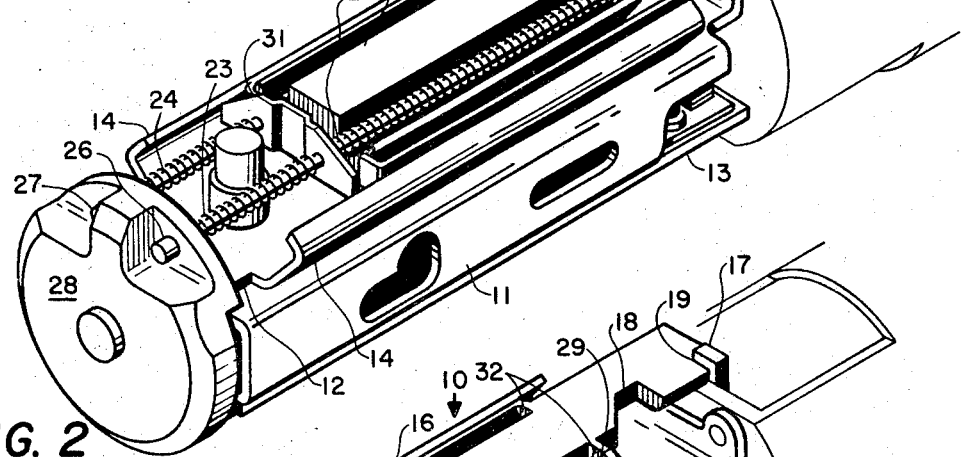
FIG. 2 is a perspective view showing the setback weight in the travel position.

Referring to the drawings in detail for a more complete understanding of the invention where only that portion of the safety-arming device relating to the invention will be described, the safety-arming device 10 comprises a main body element or escape block 11, a top plate 12, and a bottom plate 13.

Figure 4:
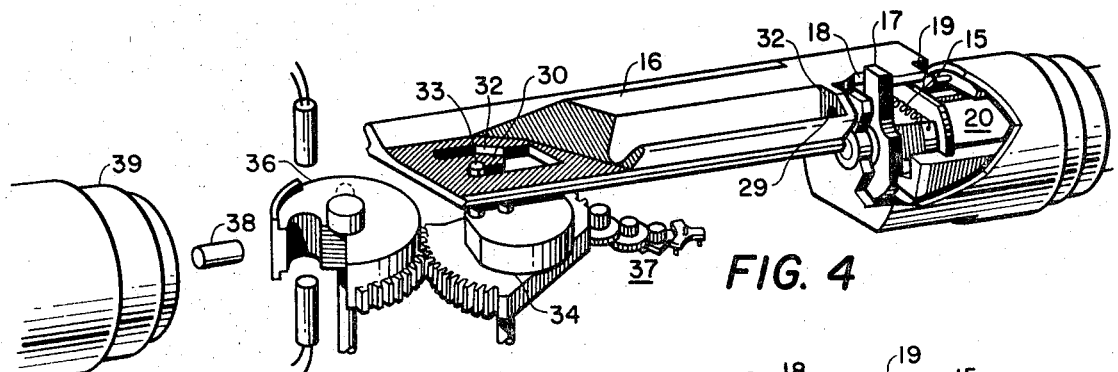
FIGS. 4 to 7 are perspective views with cutaway portions showing the internal mechanisms progressing from the safe condition to the reset condition.
Figure 5:
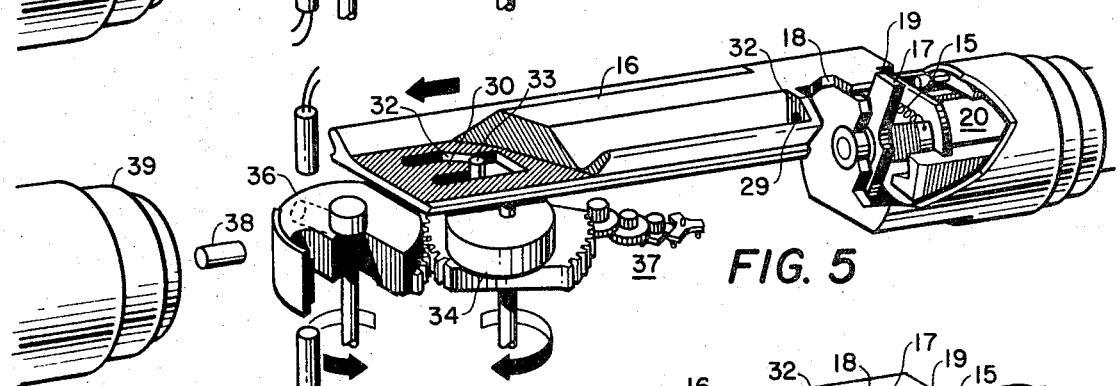
Figure 6:
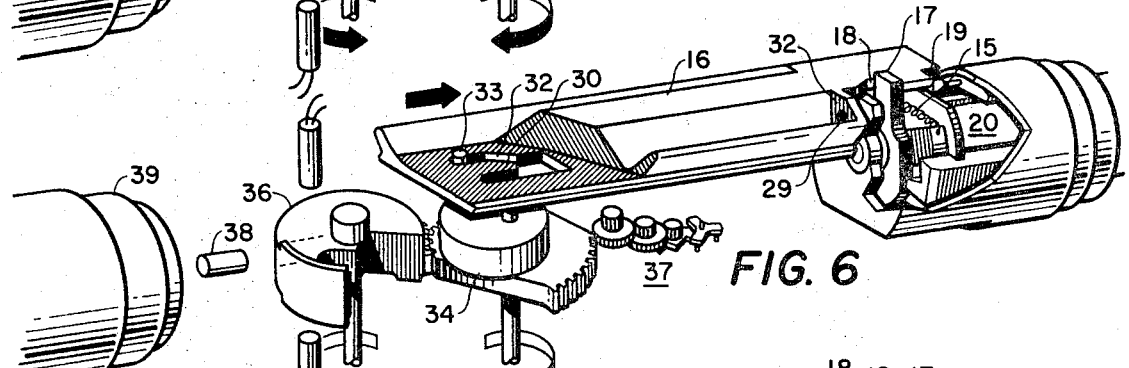
Figure 7:
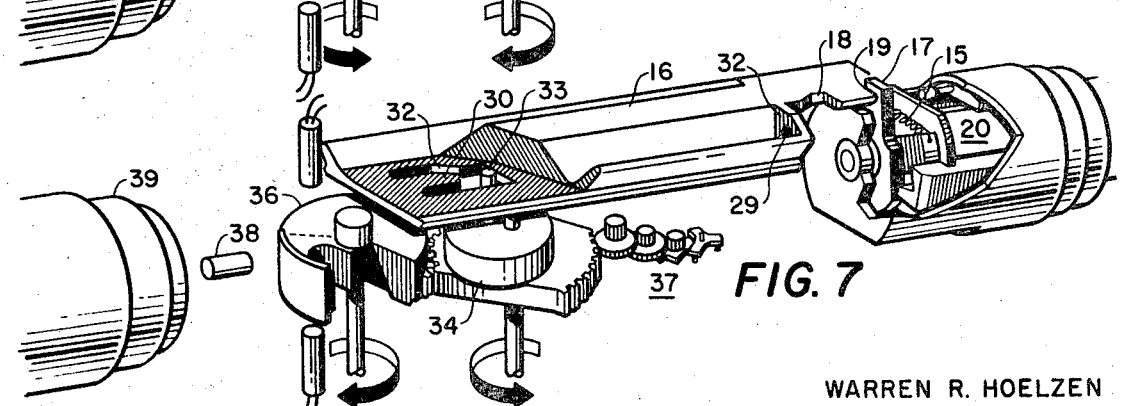

A pair of side rails 14 are formed as extensions of top plate 12 to provide a guide way for setback weight 16. Launch latch 17 cooperates with notches or recessed portions 18 and 19 of setback weight 16 to latch weight 16 in either of two positions. Latch 17 is controlled by an electric motor 20 and spring 15. When motor 20 is unenergized, latch 17 is held in slot or notch 18 by spring 15 and locks setback weight 16 in its forward position (FIGS. 1 and 4). This position is used to lock the safety-arming device in its safe condition prior to arming and in its armed condition after arming.

A pair of spaced-apart guide pins 26 and 27 are mounted in end plate 28 and project into openings at 29 in the weight 16. Two pairs of coil compression return springs 21, 24 are mounted on guide pins 26 and 27. Springs 21 are adapted to seat between plate 31 and the shoulder portions 32 of weight 16. Springs 24 are adapted to seat between plate 31 and the face of end plate 28. Springs 21 are compressible by acceleration forces which are experienced in missile flight while springs 24, acting as overtravel springs, require a higher acceleration force to compress than that experienced in missile flight.

Weight 16 is further provided on its underneath side with a recessed cam slot 32 (FIGS. 4—7) and is adapted to guide the movement of pin 33 projecting upwardly from rotor 34.

As described in the above-mentioned Voida et al. application, a pair of counterweighted rotors 34 and 36 are rotatably mounted between top plate 14 and bottom plate 13. These rotors are sensitive to acceleration forces and are geared to each other and to a time delay gear train 37. Rotors 34 and 36 rotate in response to the acceleration force and position explosive lead 38 in line with booster 39 after a sufficient time delay cause by gear train 37.

In the following description of the sequence of operation, the acceleration forces may be applied on a centrifuge when testing or may be the natural acceleration forces experienced during the flight of a missile. At zero acceleration or at launch, weight 16, latch 17, and pin 33 are in the positions shown in FIGS. 1 and 4. At launch, latch 17 is moved out of slot 18 and permits weight 16 to move to the right sufficiently that pin 33 (FIG. 5) is free to move in cam slot 32 to the position of no return, i.e., slightly beyond apex 30 of cam slot 32. Thus, when the acceleration force diminishes and weight 16 is returned to the position shown in FIG. 1, pin 33 is guided to the position shown in FIG. 6. If the acceleration force had diminished before pin 33 reached the apex 30 of cam slot 32, weight 16 would have returned to its original position (FIG. 1) and pin 33 would have been guided to the position shown in FIG. 4.

Figure 3:
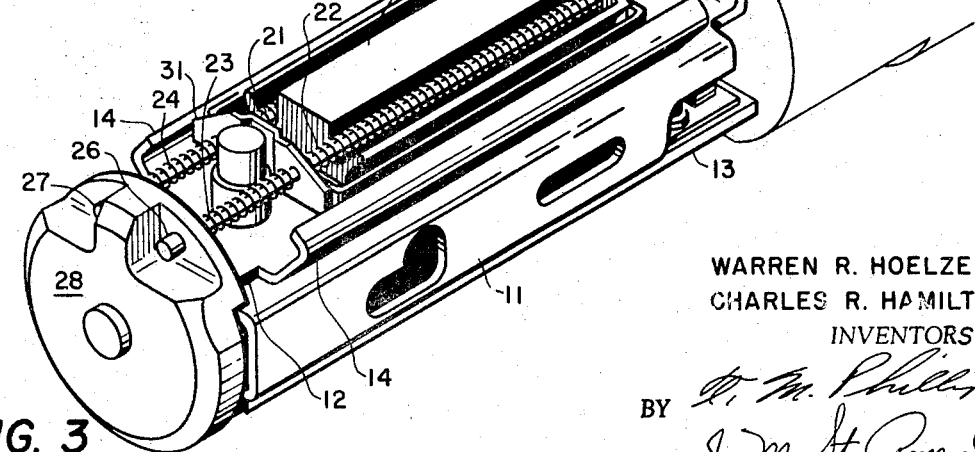
FIG. 3 is a perspective view showing the setback weight in the overtravel position and latched for reset.

After the safety-arming device has been armed (FIGS. 1 and 6), the following procedure will return it to the safe condition (FIGS. 1 and 4): The safety-arming device is aligned on the arm of a centrifuge (not shown) so that the centrifugal force is in the same sense as that caused by forward acceleration in the missile; launch latch motor 20 is energized to move latch 17 to free weight 16; the centrifuge is brought up to a velocity capable of compressing overtravel springs 24 by weight 16 (FIGS. 3 and 7); motor 20 is deenergized, locking weight 16 in this position; the safety-arming device is turned end-for-end on the centrifuge, thus, applying the centrifugal force in the opposite direction to that necessary to arm the device; rotors 34 and 36 are driven back to their prelaunch positions (FIGS. 1 and 4) and launch latch motor 40 is energized to permit weight 16 to be returned to its prelaunch position.

Briefly stated, in summary, the present invention contemplates the provision of a new and improved safety-arming device capable of being reset to a safe condition, after being armed, without removal of the mechanism from its housing.

Obviously many modifications and variations of the present invention are possible in the light of the above teachings. It is therefore to be understood that within the scope of the appended claims the invention may be practiced otherwise than as specifically described.

We claim:

1. In an inertia operated safety-arming device for a missile, the improvement comprising:
   a. a setback weight having first and second operating positions and being mounted for longitudinal reciprocal motion;
   b. means for locking said setback weight in said first and said second operating positions;
   c. means responsive to longitudinal acceleration forces normally encountered in missile flight for arming said device;
   d. first resilient means coupled to said setback weight for allowing said setback weight to travel a predetermined distance intermediate said first and second operating positions in response to acceleration forces encountered in normal missile flight;
   e. second resilient means coupled to said setback weight for allowing said setback weight to travel a distance greater than said predetermined distance to said second operating position in response only to acceleration forces greater than said acceleration forces encountered in normal missile flight; and f. control means coupling said arming means to said setback weight for permitting said arming means to return to a safe condition when said setback weight is locked in said second operating position and acceleration forces opposite to the acceleration forces for arming said device are applied.

2. The inertia operated safety-arming device of claim 1 wherein said first and second resilient means are two pair of coil compression return springs, respectively mounted on guide pins for guiding the longitudinal motion of said setback weight.

3. The inertia operated safety-arming device of claim 1 wherein said locking means comprises first and second notches in said setback weight cooperating with an electromagnetically operated latch.

4. The inertia operated safety-arming device of claim 1 wherein said control means includes a cam slot in said setback weight of sufficient width to permit said setback weight to travel to said second operating position and permit return of said control means to said safe condition.

5. In an inertia operated safety-arming device for a missile, the improvement comprising:
  a. a setback weight having first and second operating positions and being mounted for longitudinal reciprocal motion;
  b. means for locking said setback weight in said first and said second operating positions;
  c. a pair of eccentrically weighted geared together rotors pivotably mounted within said device and responsive to longitudinal acceleration forces normally encountered in missile flight for rotating said rotors to an armed position;
  d. first resilient means coupled to said setback weight for allowing said setback weight to travel a predetermined distance intermediate said first and second operating positions in response to acceleration forces encountered in normal missile flight;
  e. second resilient means coupled to said setback weight for allowing said setback weight to travel a distance greater than said predetermined distance to said second operating position in response only to acceleration forces greater than said acceleration forces encountered in normal missile flight; and
  f. control means connecting said setback weight and one of said rotors for permitting said rotors to return to a safe position from said armed position when said setback weight is locked in said second operating position and acceleration forces opposite to the acceleration forces for arming said device are applied.

6. The inertia operated safety-arming device of claim 5 wherein said first and second resilient means are two pair of coil compression return springs, respectively mounted on guide pins for guiding the longitudinal motion of said setback weight.

7. The inertia operated safety-arming device of claim 5 wherein said locking means comprises first and second notches in said setback weight cooperating with an electromagnetically operated latch.

8. The inertia operated safety-arming device of claim 5 wherein said control means includes a cam slot in said setback weight of sufficient width to permit said setback weight to travel to said second operating position and permit return of said rotors to the safe position.